United States Patent [19]

Isobe et al.

[11] Patent Number: 5,598,291

[45] Date of Patent: Jan. 28, 1997

[54] POLYGON MIRROR MOUNTING STRUCTURE

[75] Inventors: Soichi Isobe; Masaaki Sano; Yoshio Inoue, all of Kanagawa-ken; Kazuo Shimizu, Saitama-ken, all of Japan

[73] Assignee: Ebara Corporation, Tokyo, Japan

[21] Appl. No.: 310,753

[22] Filed: Sep. 23, 1994

[30] Foreign Application Priority Data

Sep. 24, 1993 [JP] Japan .................................. 5-261481
Sep. 6, 1994 [JP] Japan .................................. 6-239484

[51] Int. Cl.$^6$ .......................... G02B 26/08; G02B 7/182
[52] U.S. Cl. ...................... 359/198; 359/200; 359/216; 359/871
[58] Field of Search ................... 359/198–200, 359/216–219, 871

[56] References Cited

U.S. PATENT DOCUMENTS 4,984,881  1/1991  Osada et al. .

FOREIGN PATENT DOCUMENTS

| | | |
|---|---|---|
| 58-50329 | 11/1983 | Japan . |
| 59-23324 | 2/1984 | Japan . |
| 61-94811 | 6/1986 | Japan . |
| 61-94809 | 6/1986 | Japan . |
| 61-175613 | 8/1986 | Japan . |
| 61-175612 | 8/1986 | Japan . |
| 61-160419 | 10/1986 | Japan . |
| 61-182518 | 11/1986 | Japan . |
| 62-59917 | 3/1987 | Japan . |
| 63-131121 | 6/1988 | Japan . |
| 63-84118 | 6/1988 | Japan . |
| 63-199315 | 8/1988 | Japan . |
| 63-266420 | 11/1988 | Japan . |
| 64-12126 | 1/1989 | Japan . |
| 64-32513 | 3/1989 | Japan . |
| 1-128214 | 9/1989 | Japan . |
| 2-3518 | 1/1990 | Japan . |
| 2-11359 | 3/1990 | Japan . |
| 2-64915 | 5/1990 | Japan . |
| 2-60472 | 5/1990 | Japan . |
| 2-103778 | 8/1990 | Japan . |
| 3-2887 | 1/1991 | Japan . |
| 3-18811 | 1/1991 | Japan . |
| 3-45073 | 4/1991 | Japan . |
| 3-45509 | 4/1991 | Japan . |
| 3-157513 | 7/1991 | Japan . |
| 3-172819 | 7/1991 | Japan . |
| 3-81915 | 8/1991 | Japan . |
| 4-21341 | 1/1992 | Japan . |
| 4-51073 | 4/1992 | Japan . |
| 4-79317 | 7/1992 | Japan . |
| 4-112221 | 9/1992 | Japan . |
| 4-307108 | 10/1992 | Japan . |
| 4-353817 | 12/1992 | Japan . |
| 5-19199 | 1/1993 | Japan . |
| 5-16575 | 4/1993 | Japan . |
| 5-16574 | 4/1993 | Japan . |
| 5-88106 | 4/1993 | Japan . |
| 5-127115 | 5/1993 | Japan . |
| 5-134202 | 5/1993 | Japan . |
| 5-187436 | 7/1993 | Japan . |
| 6-27402 | 2/1994 | Japan . |
| 6-27403 | 2/1994 | Japan . |
| 6-51226 | 2/1994 | Japan .................................. 359/198 |
| 6-54023 | 7/1994 | Japan . |
| 6-77107 | 9/1994 | Japan . |

OTHER PUBLICATIONS

Ebara Review 143, Apr. 1989, p. 20.

*Primary Examiner*—James Phan
*Attorney, Agent, or Firm*—Wenderoth, Lind & Ponack

[57] ABSTRACT

A polygon mirror mounting structure mounting a polygon mirror to an outer periphery of a rotor includes a mirror seating surface formed on the outer peripheral portion of the rotor for seating the polygon mirror thereon, and a retaining member having a ring-shaped configuration and a plurality of radially extending pawls on the outer periphery thereof for retaining the polygon mirror on the mirror seating surface. The pawls have an arcuate or tapered cross-sectional configuration and directly press the polygon mirror downwardly and radially outwardly, to thereby enable securing the polygon mirror to the rotor without providing through-holes for receiving screws in the polygon mirror.

18 Claims, 9 Drawing Sheets

POLYGON MIRROR MOUNTING STRUCTURE

BACKGROUND OF THE INVENTION

1. Field of the Art

The present invention relates to a structure mounting a polygon mirror on a rotor of a polygon mirror scanner motor.

2. Prior Art

A polygon mirror mounted on a rotor of a polygon mirror scanner motor is known.

FIG. 10 is a sectional view showing the structure of a rotor of a conventional polygon mirror scanner motor of the type described above. In FIG. 10, reference numeral 51 denotes a cylindrical ceramic ring. A yoke (sleeve) 52 is shrink-fitted to the ceramic ring 51. Thereafter, surfaces of the yokes (sleeves) 52 and 55 which are to come into contact with a polygon mirror 53 are finished with extremely accurate flatness and surface roughness. Then, the polygon mirror 53 is held between the yokes 52 and 55 and firmly fastened by a plurality of screws 66. In addition, a rotor magnet 56 of the motor is rigidly secured to the lower surface of the yoke 55. It should be noted that the polygon mirror 53 has a polygonal plane, and a number of mirror surfaces 54 which is equal to the number of sides of the polygonal plane are formed on the outer periphery of the polygon mirror 53.

FIG. 11 shows a section of a conventional polygon mirror scanner motor having the above-described rotor incorporated therein. As illustrated in the figure, the polygon mirror scanner motor includes a mounting plate 57. A support shaft 58 is secured to the mounting plate 57, and a ceramic radial shaft 59 is secured to the support shaft 58. A ceramic thrust plate 61 is secured to the lower end surface of the radial shaft 59. The above-described rotor is disposed in such a manner that the ceramic ring 51 is in sliding contact with the outer periphery of the radial shaft 59, and the lower end surface of the ceramic ring 51 is in sliding contact with the thrust plate 61. Another ceramic thrust plate 60 is secured to the lower surface of a support plate 67. The thrust plate 60 is in contact with the upper end surface of the radial shaft 59. The outer peripheral surface of the ceramic radial shaft 59 and the inner peripheral surface of the ceramic ring 51 constitute a radial hydrodynamic bearing. Meanwhile, thrust hydrodynamic bearings are composed of the respective surfaces of the ceramic thrust plates 60 and 61, which are secured to the upper and lower end surfaces of the radial shaft 59, and the upper and lower surfaces of the ceramic ring 51.

The support plate 67 is secured to the upper end of the support shaft 58 by using a bolt 62. A counter magnet 63 is secured to a predetermined position on the lower surface of the support plate 67 to levitate the yoke 52, which is made of a magnetic material, by a predetermined magnetic force. By supplying a driving current (AC) to a stator coil 64, the rotor, having the polygon mirror 53, is driven to rotate at high speed.

However, the above-described conventional polygon mirror mounting structure suffers from the following problems:

(1) The polygon mirror 53 must be provided with several through-holes for receiving the screws 66. Therefore, when the polygon mirror 53 is rotated at high speed, there is a difference in the radial deformation of the polygon mirror 53, which is caused by centrifugal force and heat, between a portion where a through-hole is provided and a portion where no through-hole is provided. As a result, non-uniform deformation occurs, and hence non-uniform deformation is induced for each of the mirror surfaces 54. The non-uniform deformation in the polygon mirror exerts an adverse effect such as bad Dynamic Tracking Jitter or low Dynamic Tracking Accuracy.

(2) The polygon mirror 53 is rigidly fastened to the yokes 52 and 55 by several screws 66, and the fastening is controlled by only the surface friction occurring between the contact surfaces of the yokes 52 and 55 and the polygon mirror 53. Accordingly, if there is a temperature change, e.g., a rise in temperature during rotation at high speed or a lowering in temperature during storage, since the polygon mirror 53 is made of an aluminum material while the yokes 52 and 55 are made of a steel material, a large difference in the coefficients of thermal expansion causes slippage to occur between the contact surfaces of the polygon mirror 53 and the yokes 52 and 55. Such slippage exerts an adverse effect on the mirror surfaces 54, causing bad Dynamic Tracking Jitter or low Dynamic Tracking Accuracy over time and also results in the rotor becoming unbalanced due to relative radial displacement between the polygon mirror and the yokes, resulting in an increase in the magnitude of vibration.

(3) Since the performance is mostly determined by the surface friction occurring between the contact surfaces of the polygon mirror 53 and the yokes 52 and 55, it is necessary to finish the surfaces of the yokes 52 and 55 which are to come in contact with the polygon mirror 53 and the surfaces of the polygon mirror 53 which are to come in contact with the two yokes 52 and 55, that is, a total of 4 surfaces, with a highly accurate degree of flatness and surface roughness over a considerably wide area, thus causing a rise in processing costs.

(4) Since the height of the yoke 52 which is to be shrink-fitted to the ceramic ring 51 is lower than that of the ceramics ring 51, the yoke 52 is shrink-fitted only to an upper portion of the ceramic ring 51. Accordingly, vertically non-uniform residual stress is applied to the ceramic ring 51 after the yoke 52 has been shrink-fitted thereto. Consequently, the upper and lower end surfaces of the ceramic ring 51 are largely deformed. Therefore, it has heretofore been necessary to carry out correction-processing after the shrink fitting process.

(5) When screws are fastened to the yoke 55, the portions of the yoke 55 near the screws are deformed, thus deforms the reference surface of the polygon mirror 53 contacting the yoke surface. Further, since several screws are used for fastening, the fastening order of the screws, an additional fastening (or twice fastening) of the screws and the torque for fastening must be controlled, which complicates the assembly operation and increases man-hours.

(6) Rotor magnet 56 is secured to the lower surface of the yoke 55 by an adhering agent. However, the adhering agent often enters the screw holes which prevents complete fastening of the screws.

(7) In the conventional structure, the polygon mirror 53, the yoke 55 and the rotor magnet 56 are suspended from the sleeve 52, which is shrink-fitted to the ceramic ring 51, by using the screws 66. Therefore, the overall weight of the suspended members is considerably greater than the weight of the sleeve 52, and during high-speed rotation, the suspended members, which have such a large overall weight, are rotated relying only on the support of the screws 66. Accordingly, the stability of the rotor is unsatisfactory, and balance deteriorates with time, resulting in an increase in the magnitude of vibration.

SUMMARY OF THE INVENTION

In view of the above-described characteristics, it is an object of the present invention to eliminate the above-described problems and to provide a polygon mirror mounting structure which does not cause bad Dynamic Tracking Jitter or low Dynamic Tracking Accuracy, which will not become unbalanced over time, and which is also easy to produce.

To solve the above-described problems, the present invention provides a polygon mirror mounting structure securing a polygon mirror on the outer periphery of a rotor, wherein the polygon mirror is seated on a mirror seating surface formed on the outer peripheral portion of the rotor, and the polygon mirror is pressed for securing both downwardly and radially outwardly by pawls of a flat ring-like retaining member, which has a plurality of radially extending pawls with tapered or arcuate cross-sectional configuration on the outer periphery thereof.

Preferably, a ring-like step portion is formed on the upper surface of the polygon mirror concentrically with a central hole for receiving the rotor therethrough, and the pawls of the retaining member press the inner peripheral corner portion of the ring-like step portion for radially positioning the polygon mirror.

The rotor may include a cylindrical ceramic ring having an inner peripheral surface serving as a sliding surface of a radial hydrodynamic bearing and two end surfaces serving as sliding surfaces of thrust hydrodynamic bearings, and a sleeve rigidly secured to the outer periphery of the ceramic ring, the mirror seating surface being formed on the outer peripheral portion of the sleeve.

The sleeve may be a cylindrical sleeve with an L-shaped cross-sectional configuration which is approximately equal in height to the ceramic ring and having an outer periphery including a small-diameter portion and a large-diameter portion. The mirror seating surface is formed on a step portion defined between the small- and large-diameter portions of the sleeve.

The retaining member is preferably a magnetic member so that the rotor can be levitated by a counter magnet.

The radial distance of a position where the pawls of the retaining member press the polygon mirror is preferably positioned between the radial distances of the inner and outer peripheries of the mirror seating surface of the sleeve.

With the above-described arrangement of the present invention, the pawls of the retaining member press the polygon mirror with force Fa by bending obliquely upward. More specifically, the pawls of the retaining member press the polygon mirror downwardly with a vertical force component of the force Fa to secure the polygon mirror to the mirror seating surface. At the same time, the pawls of the retaining member thrust the polygon mirror radially outward with a radial force component of the force Fa. By the radial thrust force, the positioning of the polygon mirror in the radial direction is effected and, thereby, imbalance due to positional displacement with time is prevented.

The retaining member directly presses the polygon mirror without interposing any members therebetween. Thus, the polygon mirror is pressed with a concentrated load due to linear contact without relying on a frictional surface contact. Therefore, the polygon mirror is positively secured to the rotor without causing any positional displacement.

In addition, since the polygon mirror is clamped between the mirror seating surface formed on the outer peripheral portion of the rotor and the pawls of the retaining member, the polygon mirror need not be provided with holes for mounting screws except for a central hole for receiving the sleeve. Accordingly, when the polygon mirror rotates at high speed, deformation caused by centrifugal force and heat becomes uniform, and non-uniform deformation will not be induced in each of the mirror surfaces of the polygon mirror. There is therefore no likelihood that deformation will cause bad Dynamic Tracking Jitter or low Dynamic Tracking Accuracy.

When the polygon mirror is secured to the mirror seating surface formed on the step portion of the sleeve as a reference surface and is elastically pressed by the retaining member from above, and if the radial distance of the position of the pawls of the retaining member which come into contact with the polygon mirror is positioned between the radial distances of the mirror seating surface, the pressing force exerted by the pawls of the retaining member acts only as a downward compression force and a radial thrust force on the polygon mirror. Therefore, there is no adverse effect on the deformation of the mirror surfaces, which may lead to bad Dynamic Tracking Jitter or low Dynamic Tracking Accuracy.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

Preferred embodiments of the present invention will be described below with reference to the accompanying drawings.

Figure 1:
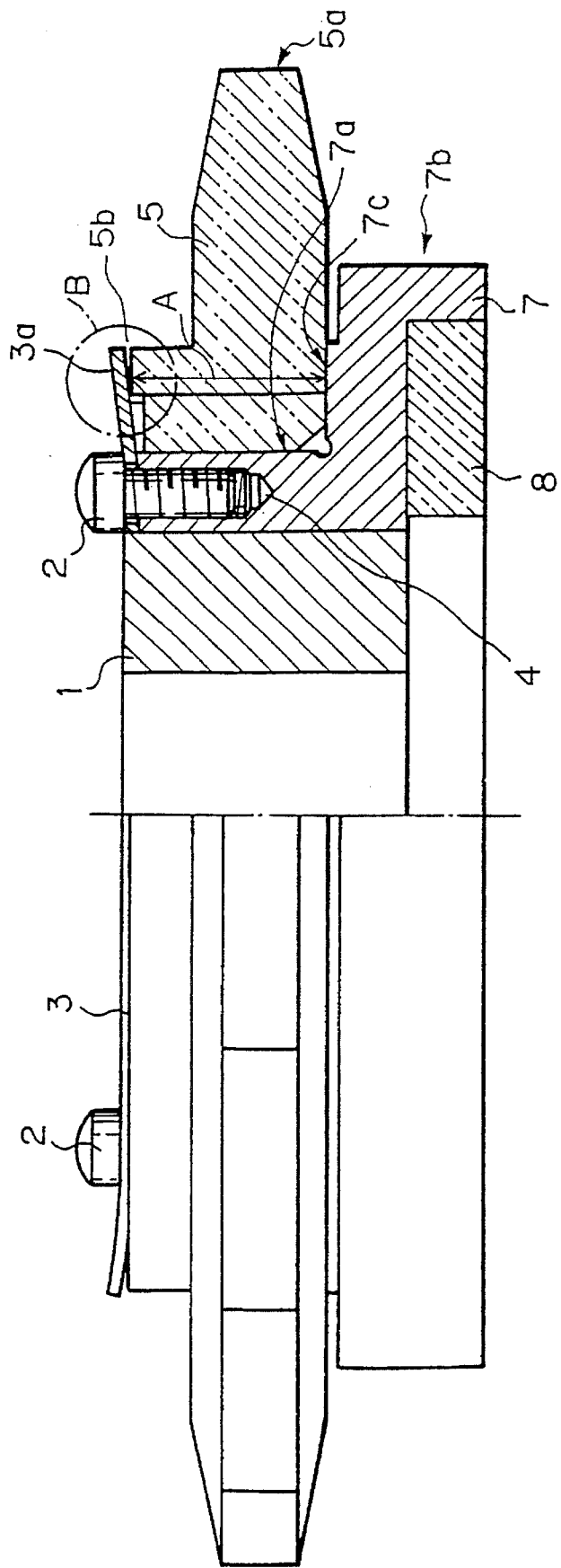
FIG. 1 is a partly-sectioned front view showing a polygon mirror mounting structure according to one embodiment of the present invention.

FIG. 1 is a partly-sectioned front view showing a polygon mirror mounting structure according to one embodiment of the present invention. Referring to FIG. 1, a ceramic ring 1 is comprised of a cylindrical ceramic material. The inner peripheral surface of the ceramic ring 1 serves as a sliding surface of a radial hydrodynamic bearing, and each end surface of the ceramic ring 1 serves as a sliding surface of a thrust hydrodynamic bearing. A sleeve 7 is shrink-fitted to the outer periphery of the ceramic ring 1. The sleeve 7 has an inner peripheral surface having a height approximately equal to that of the ceramic ring 1 so that the sleeve 7 is shrink-fitted over the entire outer peripheral surface of the ceramic ring 1. Thus, the residual stress in the ceramic ring 1 due to shrink fitting of the sleeve 7 thereon becomes uniform.

The sleeve 7 is a cylindrical sleeve having an outer periphery including a small-diameter portion 7a and a large-diameter portion 7b. Thus, the sleeve 7 has an L-shaped cross-sectional configuration. A ring-shaped mirror seating surface 7c for retaining the lower surface of a polygon mirror 5 is formed on a step portion defined between the small- and large-diameter portions 7a and 7b. The polygon mirror 5 has a polygonal plane, and a number of mirror surfaces 5a which is equal to the number of sides of the polygonal plane are formed on the outer periphery of the polygon mirror 5. The center of the polygon mirror 5 is formed with a sleeve receiving hole through which is to extend the small-diameter portion 7a of the sleeve 7. In addition, an annular ring-shaped projection 5b is formed on the top of the polygon mirror 5 concentrically with the sleeve receiving hole.

The polygon mirror 5 is placed on the mirror seating surface 7c in such a manner that the small-diameter portion 7a of the sleeve 7, which is shrink-fitted to the outer periphery of the ceramic ring 1, is inserted into the sleeve receiving hole in the center of the polygon mirror 5. Further, a retaining member 3 is placed on the projection 5b and then fastened by using a plurality of screws 2 which are engaged with tapped holes 4 provided in the upper end surface of the sleeve 7, thereby firmly clamping the polygon mirror 5 between a plurality of the pawls 3a of the retaining member 3 and the mirror seating surface 7c.

The ceramic ring 1 and the sleeve 7 constitute a rotor for mounting the polygon mirror 5 thereon. The specific construction of the retaining member 3 will be explained hereinafter.

Figure 2:
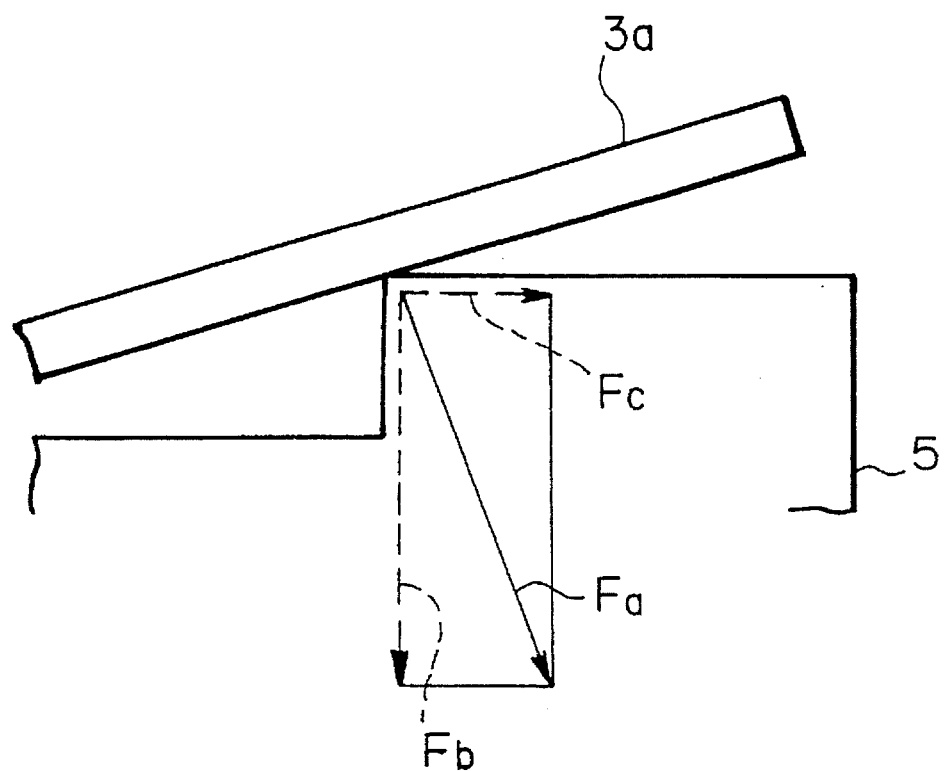
FIG. 2 is an enlarged view of a portion B in FIG. 1.

As the screws 2 are tightened, the pawls 3a of the retaining member 3 are arcuately bent so as to extend radially outward and obliquely upward. Thus, as shown in FIG. 2 (enlarged view of the portion B in FIG. 1), the pawls 3a of the retaining member 3 press the polygon mirror 5 by elastic force Fa. That is, each of the pawls 3a of the retaining member 3 presses the polygon mirror 5 both downwardly and radially outwardly by the component forces Fb and Fc of the elastic force Fa. Consequently, the polygon mirror 5 is secured to the mirror seating surface 7c by the component force Fb and, at the same time, is thrust radially by the component force Fc. Since the radially thrusting component force Fc enables positioning of the polygon mirror 5 in the radial direction, it is possible to prevent an imbalance of the mounting due to displacement of the polygon mirror 5 with time. It should be noted that a rotor magnet 8 is rigidly secured to the lower surface of the sleeve 7.

With the above-described polygon mirror mounting structure, the performance of the mounting structure is determined by the ring-shaped mirror seating surface 7c of the sleeve 7 and a surface of the polygon mirror 5 that contacts the mirror seating surface 7c. Accordingly, the area of contact surfaces which need to be finished with highly accurate flatness and surface roughness is far narrower than in the case of the conventional polygon mirror mounting structure. Therefore, processing is facilitated.

Figure 11:
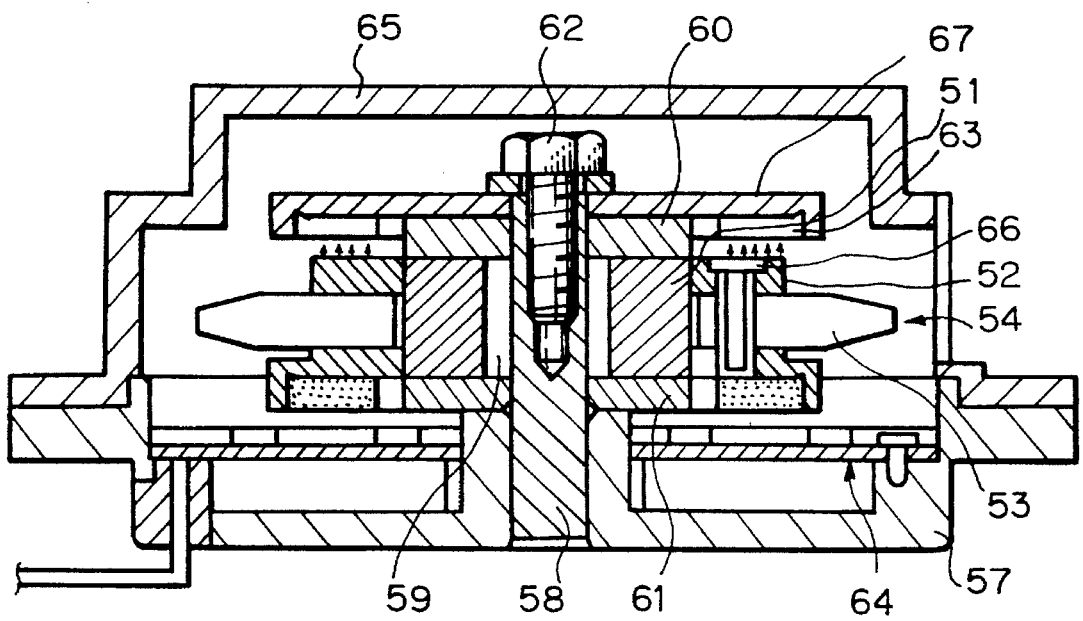
FIG. 11 is a section of a conventional polygon mirror scanner motor.

The polygon mirror mounting structure shown in FIG. 1 is incorporated into a polygon mirror scanner motor such as that shown in FIG. 11. If the retaining member 3 is made of a magnetic metal material, the rotor can be levitated by a counter magnet (see the counter magnet 63 in FIG. 11). It is therefore possible to reduce the torque required to rotate the motor against the thrust frictional resistance of the thrust hydrodynamic bearings at the time of starting the motor.

Figure 3:
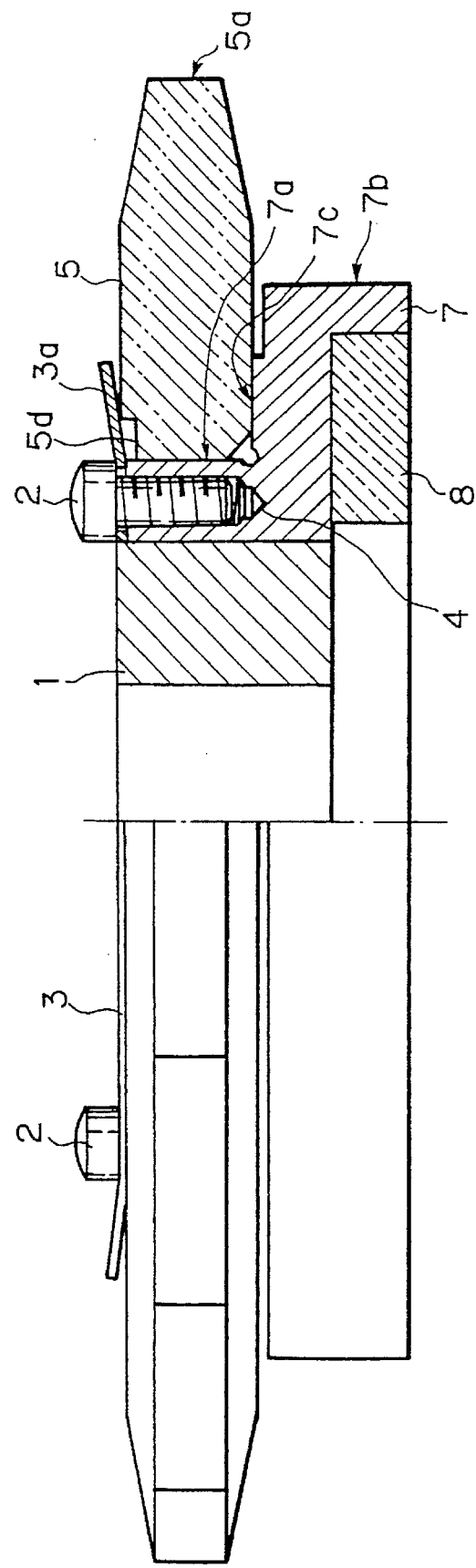
FIG. 3 is a partly-sectioned front view showing a polygon mirror mounting structure according to another embodiment of the present invention.

Although in the structure shown in FIG. 1, a ring-shaped projection 5b is formed on the top of the polygon mirror concentrically with the sleeve receiving hole, it should be noted that a ring-shaped recess 5d may be formed in the polygon mirror 5 concentrically with the sleeve receiving hole instead of the ring-shaped projection 5b, as shown in FIG. 3. In brief, it would be sufficient that a step portion is formed on the top of the polygon mirror 5 concentrically with the sleeve receiving hole so that the retaining member 3 may be pressed against the corner of the inner peripheral of the step portion, like the ring-shaped projection 5b or recess 5d, and that the pawls 3a of the retaining member 3 press the polygon mirror 5 by elastic force Fa in such a manner that the pawls 3a press the polygon mirror 5 both downwardly and radially outwardly by the component forces Fb and Fc of the elastic force Fa as shown in FIG. 2. If such conditions are satisfied, the ring-shaped projection 5b or the ring-shaped recess 5d is not always necessary.

Figure 4:
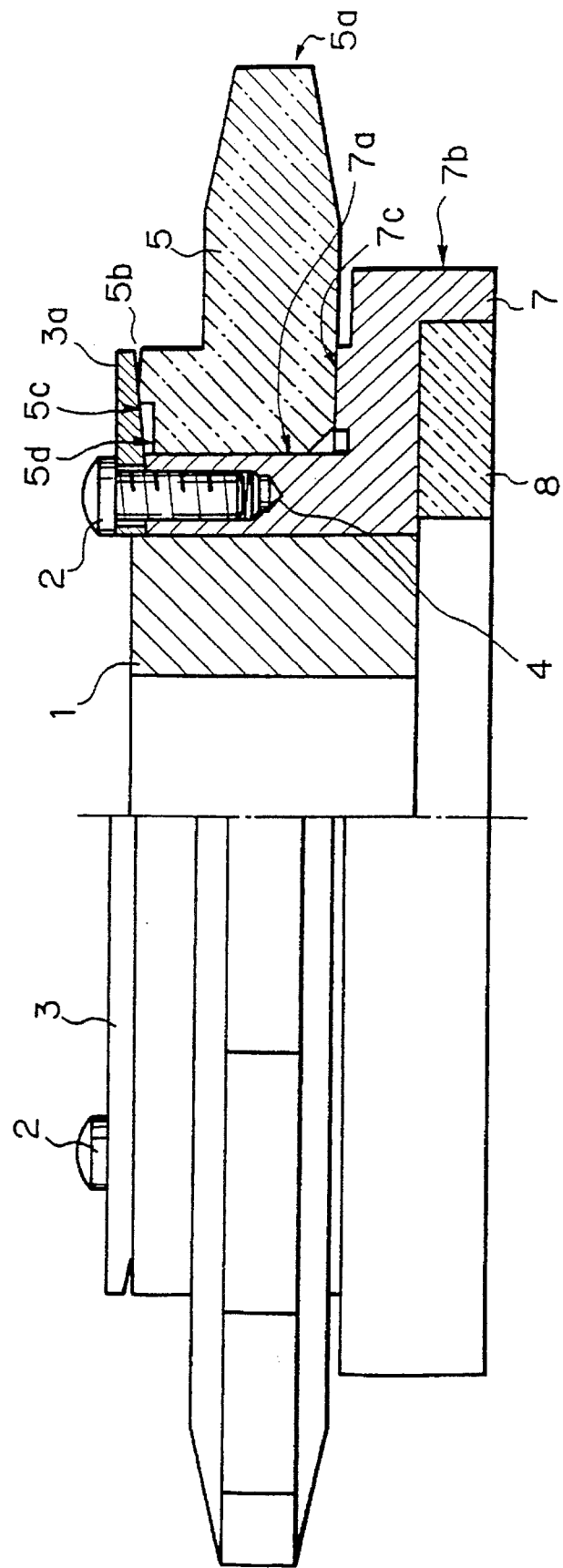
FIG. 4 is a partly-sectioned front view showing a polygon mirror mounting structure according to still another embodiment of the present invention.
Figure 5:
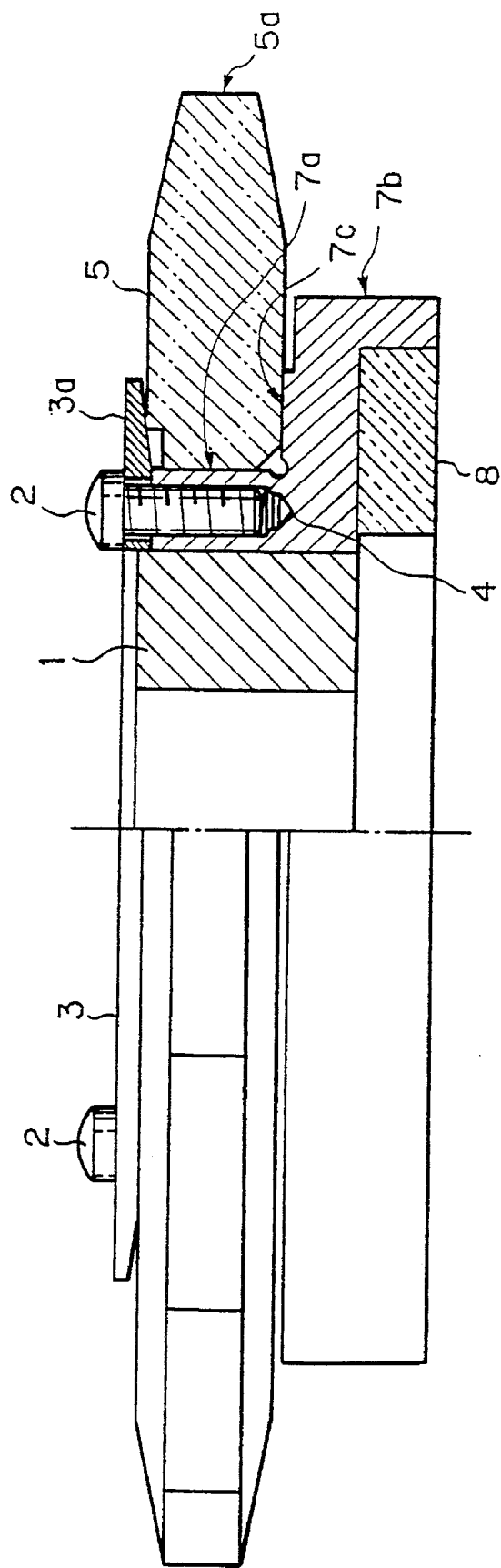
FIG. 5 is a partly-sectioned front view showing a polygon mirror mounting structure according to still a further embodiment of the invention, FIGS. 6(*a*) through 6(*c*) are views showing the structure of a retaining member employed in the polygon mirror mounting structure of the invention, wherein FIG. 6(*a*) is a plan view and FIGS. 6(*b*) and 6(*c*) are sectional views of the retaining member.

Further, in the structure shown in FIGS. 1 and 3, although the pawls 3a of the retaining member 3 are arcuately bent so as to extend radially outward and obliquely upward, it should be noted that the pawls 3a of the retaining member 3 may have a tapered cross-sectional configuration in which the outer peripheral portion of the lower side of the pawls 3a of the retaining member 3 is slanted obliquely upward toward the radially outward end thereof, as shown in FIGS. 4 and 5.

Figure 6A:
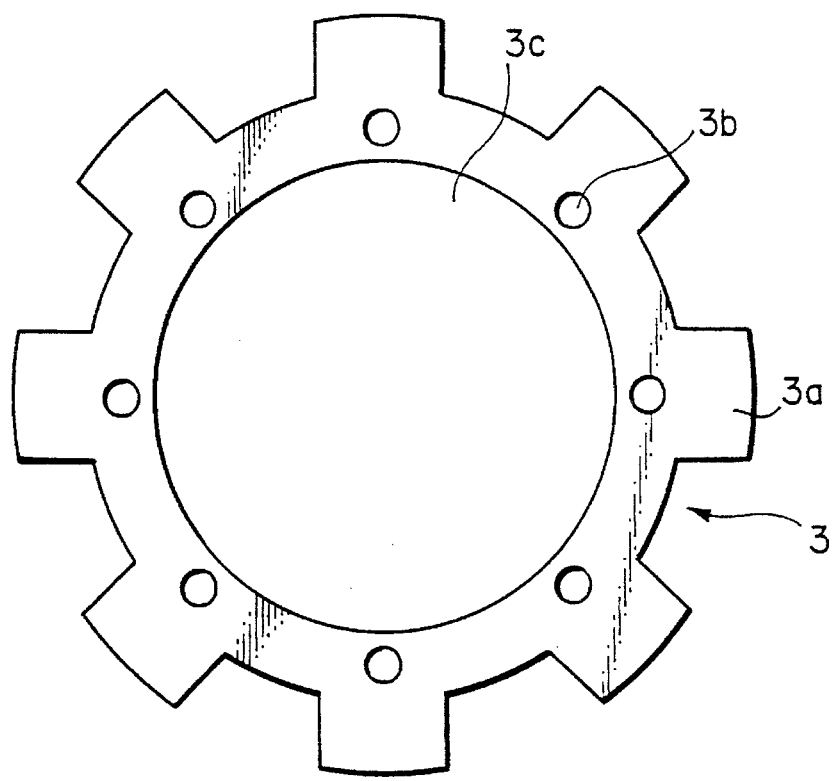
Figure 6B:
Figure 6C:
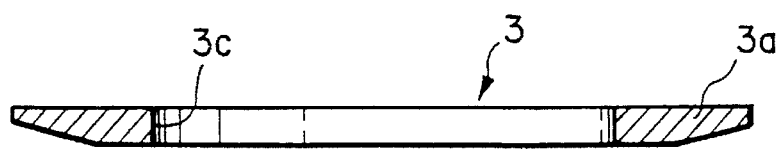

FIGS. 6(a) through 6(c) are views showing a construction of a retaining member used in the mounting structure of the invention, wherein FIG. 6(a) is a plan view of the retaining member and FIGS. 6(b) and 6(c) are side sectional views. As shown, the retaining member 3 is made of an elastic metal ring and has a central hole 3c for receiving ceramic ring 1 therethrough and a plurality of radially extending pawls 3a having an arcuate cross-sectional configuration (FIG. 6(b)) or a tapered cross-sectional configuration (FIG. 6(c)) on its outer periphery. A plurality of holes 3b are formed in a ring portion of the retaining member 3 at a predetermined spacing for receiving the screws 2.

Figure 7:
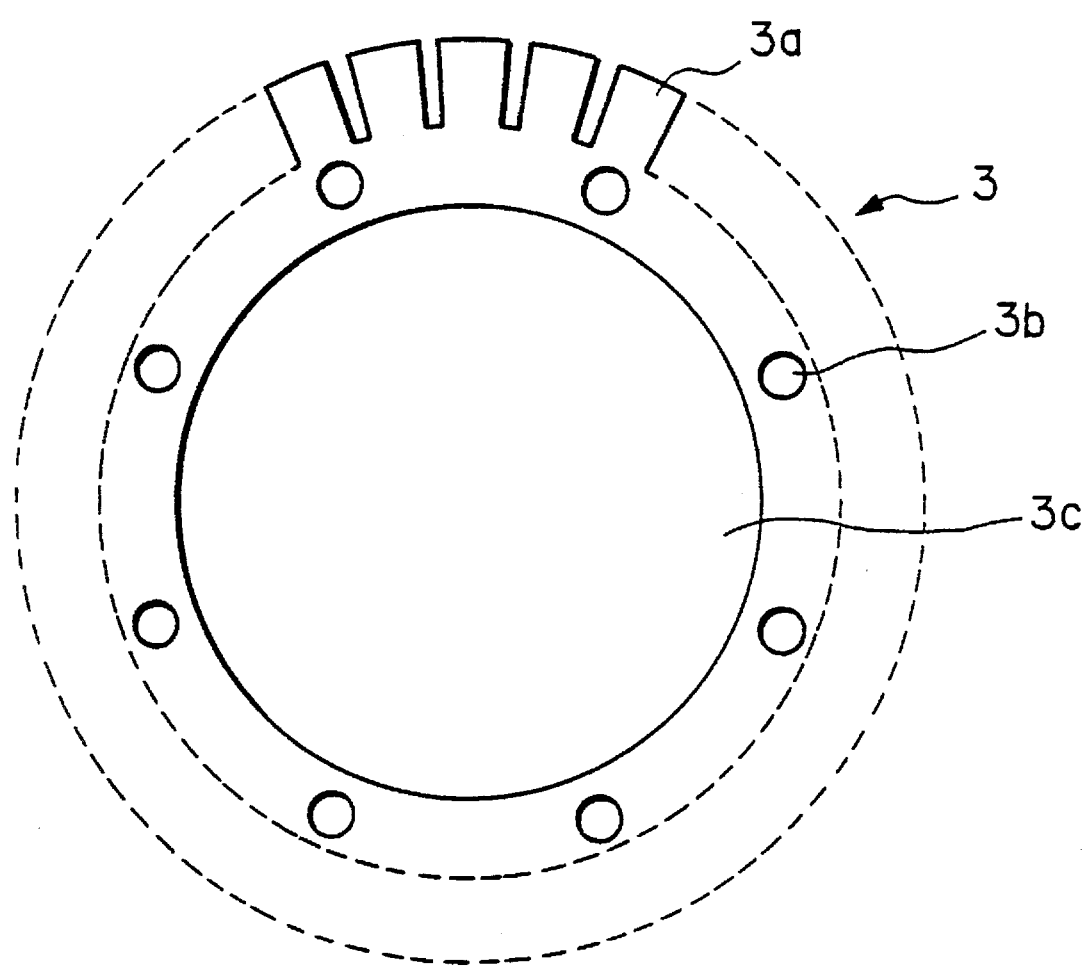
FIG. 7 is a plan view showing the structure of another retaining member of the invention.
Figure 8:
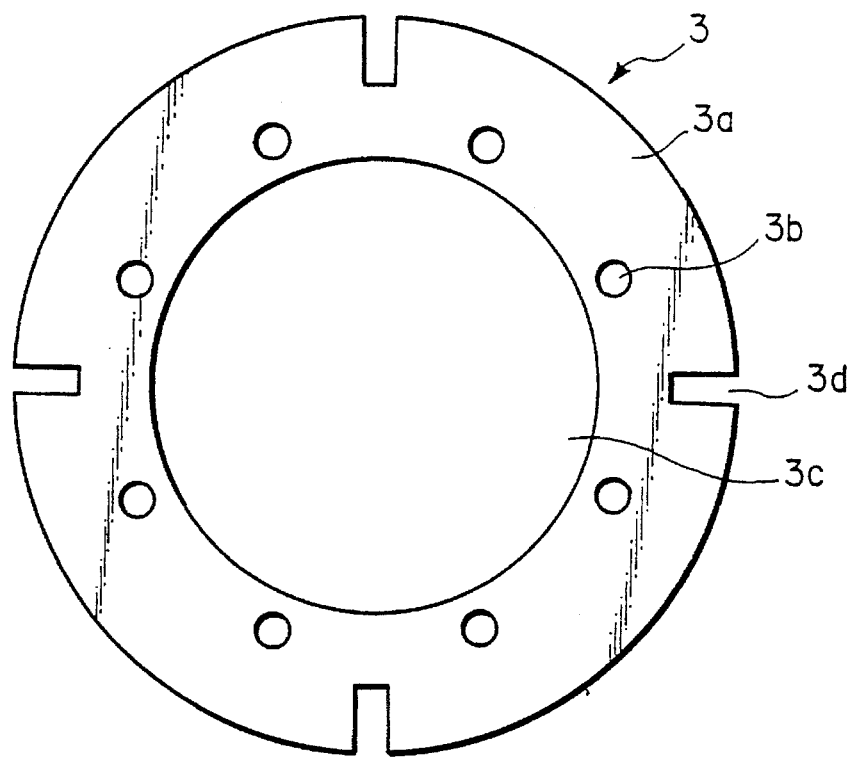
FIG. 8 is a plan view showing the structure of a still another retaining member of the invention.
Figure 9:
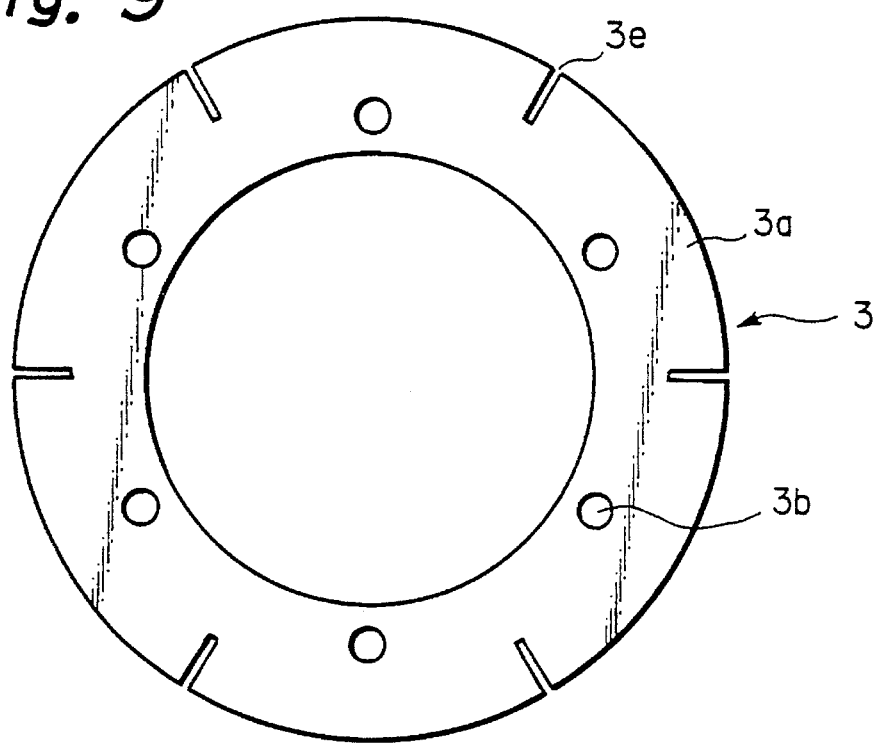
FIG. 9 is a plan view showing the structure of a still further retaining member of the invention.
Figure 10:
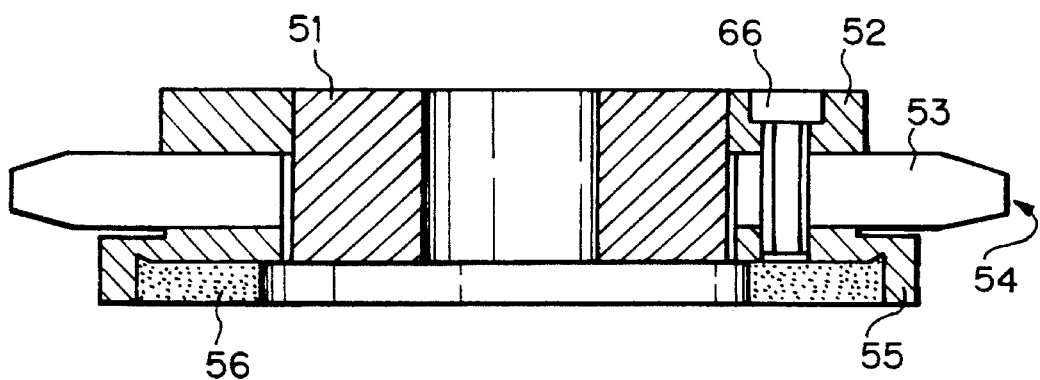
FIG. 10 is a sectional view showing the structure of a rotor of a conventional polygon mirror scanner motor.

The shape of the retaining member is not limited to that shown in FIG. 6(a), but may include other shapes such as shown in FIGS. 7, 8 and 9. That is, the retaining member may have a plurality of pawls 3a formed with a predetermined pitch as shown in FIG. 7, may be provided with a plurality of pawls 3a (four in the shown case) by forming a plurality of notches 3d (four in the shown case) in the ring portion as shown in FIG. 8, or may be provided with a plurality of pawls 3a (six in the case shown) by providing a plurality of slits 3e (six in the case shown) in the ring portion as shown in FIG. 9.

As has been described above, the present invention provides the following advantageous effects:

(1) Since the polygon mirror needs no through-holes for receiving screws, the number of steps for producing the polygon mirror decreases. Therefore, the cost can be reduced. In addition, since no through-holes for receiving screws are provided, even when the polygon mirror is rotated at high speed, there is no non-uniform deformation of mirror surfaces as occurs when a polygon mirror provided with through-holes is rotated at high speed as in the conventional case, but rather all of the mirror surfaces are uniformly deformed. Accordingly, low Dynamic Tracking Accuracy is prevented and Dynamic Tracking Jitter is lessened.

(2) Since the polygon mirror is lightly and directly secured to a mirror seating surface by a retaining member, e.g., an elastic member, using a concentrated force due to a linear contact without relying on a frictional surface contact, it is possible to elastically but firmly support the polygon mirror in conformity to deformation of the polygon mirror due to a temperature change or the like. Accordingly, the polygon mirror is excellent in reproducibility and repeated service durability and free from change with time. Further, since the retaining member also effects positioning of the polygon mirror in the radial direction, that is, with respect to the center of the rotor, there is no likelihood of the polygon mirror becoming unbalanced over time.

(3) In the case of the conventional mounting structure, the mounting screw tightening torque has heretofore been controlled for the purpose of controlling the friction occurring between the contact surfaces of the polygon mirror and the sleeves. In the present invention, however, the retaining member mounting screws are only required to secure the retaining member to the upper end of the sleeve, and there is no need of controlling the screw tightening torque during an assembly process, which makes the assembly easy and reduces man-hours therefor.

(4) In case the polygon mirror abuts the mirror seating surface formed on the step portion of the sleeve as a reference surface, the area of contact surfaces which need to be finished with highly accurate flatness and surface roughness is relatively narrow. That is, only the mirror seating surface and the surface of the polygon mirror which is to come in contact with the mirror seating surface need to be finished with a high degree of accuracy. Accordingly, the number of processing steps can be reduced to a considerable extent in comparison to the conventional polygon mirror mounting structure.

(5) When a sleeve having a height approximately equal to that of a ceramic ring is shrink-fitted to the ceramic ring, residual stress vertically uniform is applied to the ceramic ring after the shrink fitting. Consequently, deformation of the upper and lower end surfaces of the ceramic ring is held at a relatively small level. Accordingly, it becomes unnecessary to carry out post-processing after the shrink fitting process.

(6) When a sleeve having a height approximately equal to that of a ceramic ring is shrink-fitted to the ceramic ring, and a relatively lightweight polygon mirror is elastically attached to the sleeve, while a relatively heavy sleeve and rotor magnet are firmly attached to the ceramic ring, then the polygon mirror mounting structure may exhibit high stability and reliability as a high-speed rotor, and it is unlikely that the polygon mirror mounting structure will become unbalanced over time.

What is claimed is:

1. A polygon mirror mounting structure mounting a polygon mirror to an outer periphery of a rotor, said mounting structure comprising:

a mirror seating surface formed on an outer peripheral portion of said rotor for seating said polygon mirror thereon;

a ring-shaped step portion formed on the top of said mirror, said step portion extending circumferentially of said mirror and being concentric with said rotor; and a retaining member having a ring-shaped configuration and including a plurality of radially outwardly extending pawls, said retaining member being mounted with said pawls directly pressing on said step portion of said mirror and urging said mirror downwardly onto said mirror seating surface and radially outwardly.

2. A polygonal mirror mounting structure as claimed in claim 1, wherein said pawls have an arcuate or tapered cross-sectional configuration.

3. A polygonal mirror mounting structure as claimed in claim 1, wherein said rotor includes a cylindrical sleeve, said mirror seating surface is formed on an outer peripheral portion of said sleeve, and said retaining member is fixed to an inner peripheral portion of said sleeve.

4. A polygonal mirror mounting structure as claimed in claim 1, wherein said mirror has a central hole through which extends a portion of said rotor, said step portion is concentric of said central hole, and said pawls press downwardly and radially outwardly on a corner of an inner periphery of said step portion.

5. A polygonal mirror mounting structure as claimed in claim 1, wherein said step portion is formed by a ring-shaped projection or a ring-shaped recess formed at said top of said mirror.

6. A polygonal mirror mounting structure as claimed in claim 1, wherein said rotor comprises a cylindrical ceramic ring having an inner peripheral surface serving as a sliding surface of a radial hydrodynamic bearing and two end surfaces serving as sliding surfaces of thrust hydrodynamic bearings, and a cylindrical sleeve rigidly secured to an outer periphery of said ceramic ring.

7. A polygonal mirror mounting structure as claimed in claim 6, wherein said cylindrical sleeve has a portion that is approximately equal in axial height to said ceramic ring, that has an L-shaped cross-sectional configuration and that has an outer periphery including a small-diameter portion and a large-diameter portion, and said mirror seating surface is formed on a step portion defined between said small-diameter portion and said large diameter portion.

8. A polygonal mirror mounting structure as claimed in claim 7, wherein said retaining member comprises a metal ring and said pawls have elasticity.

9. A polygonal mirror mounting structure as claimed in claim 8, wherein said retaining member is formed of a magnetic material.

10. A polygonal mirror mounting structure as claimed in claim 9, wherein a radial position whereat said pawls of said retaining member press said mirror is positioned between radial positions of inner and outer peripheries of said mirror seating surface.

11. A polygonal mirror mounting structure as claimed in claim 6, wherein said retaining member comprises a metal ring and said pawls have elasticity.

12. A polygonal mirror mounting structure as claimed in claim 11, wherein said retaining member is formed of a magnetic material.

13. A polygonal mirror mounting structure as claimed in claim 12, wherein a radial position whereat said pawls of said retaining member press said mirror is positioned between radial positions of inner and outer peripheries of said mirror seating surface.

14. A polygonal mirror mounting structure as claimed in claim 6, wherein said retaining member is formed of a magnetic material.

15. A polygonal mirror mounting structure as claimed in claim 14, wherein a radial position whereat said pawls of said retaining member press said mirror is positioned between radial positions of inner and outer peripheries of said mirror seating surface.

16. A polygonal mirror mounting structure as claimed in claim 6, wherein a radial position whereat said pawls of said retaining member press said mirror is positioned between radial positions of inner and outer peripheries of said mirror seating surface.

17. A polygonal mirror mounting structure as claimed in claim 1, wherein said retaining member comprises a metal ring and said pawls have elasticity.

18. A polygonal mirror mounting structure as claimed in claim 1, wherein said retaining member is formed of a magnetic material.

* * * * *